United States Patent [19] [11] 3,774,474
Recker et al. [45] Nov. 27, 1973

[54] TRANSMISSION AND CONTROLS THEREFOR

[75] Inventors: Robert James Recker; Raymond Richard Meysenburg; Donald Wetrich, all of Cedar Falls, Iowa

[73] Assignee: Deere & Company, Moline, Ill.

[22] Filed: June 16, 1972

[21] Appl. No.: 263,589

[52] U.S. Cl........................... 74/740, 74/477, 74/335
[51] Int. Cl........ F16h 37/00, G05g 9/12, F16h 5/06
[58] Field of Search............................... 74/740, 745

[56] References Cited
UNITED STATES PATENTS

| | | | |
|---|---|---|---|
| 3,357,276 | 12/1967 | Vavulo et al. | 74/640 |
| 3,646,835 | 3/1972 | Ito et al. | 74/860 |
| 3,682,019 | 8/1972 | Hoyer et al. | 74/745 |
| 3,709,068 | 1/1973 | Mohri | 74/866 |

*Primary Examiner*—Arthur T. McKeon
*Attorney*—H. Vincent Harsha et al.

[57] ABSTRACT

A 16-speed transmission comprises an eight-speed transmission section including parallel input, counter and output shafts carrying constant mesh gearing, and the input shaft having a two-speed planetary transmission section connected thereto and controllable between first and second operative conditions for respectively driving the input shaft at a high and a low speed. A first clutch is provided for selectively causing driving engagement between two sets of gearing for respectively driving the countershaft from the input shaft at a high and a low speed, for every speed of the input shaft; and second and third clutches are provided for selectively causing driving engagement between four sets of gearing for respectively driving the output shaft from the countershaft at four different speeds, for every speed of the countershaft. A range shift lever is selectively shiftable among four operative positions for controlling the engagement and disengagement of the second and third clutches to selectively establish low, intermediate, high and transport ranges of speeds in the transmission; and a speed shift lever is shiftable among four operative positions for controlling the planetary transmission sections and the first clutch whereby any one of four speeds may be selected in each range of speeds selected by the range shift lever. Indicia is provided along with the shift patterns of the levers to indicate to the operator the position to which the levers must be shifted to obtain the next higher or lower speed from the one at which the transmission is operating.

8 Claims, 7 Drawing Figures

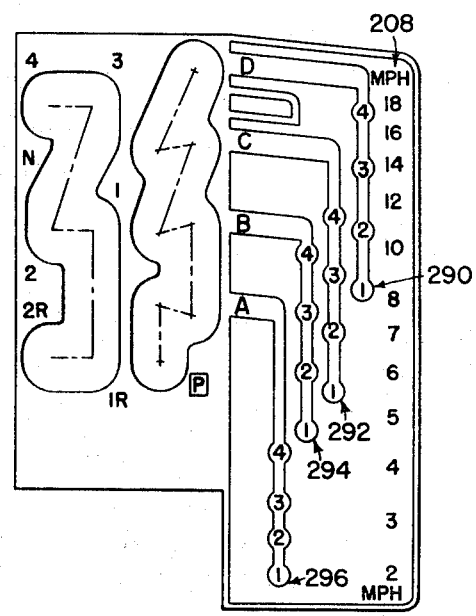
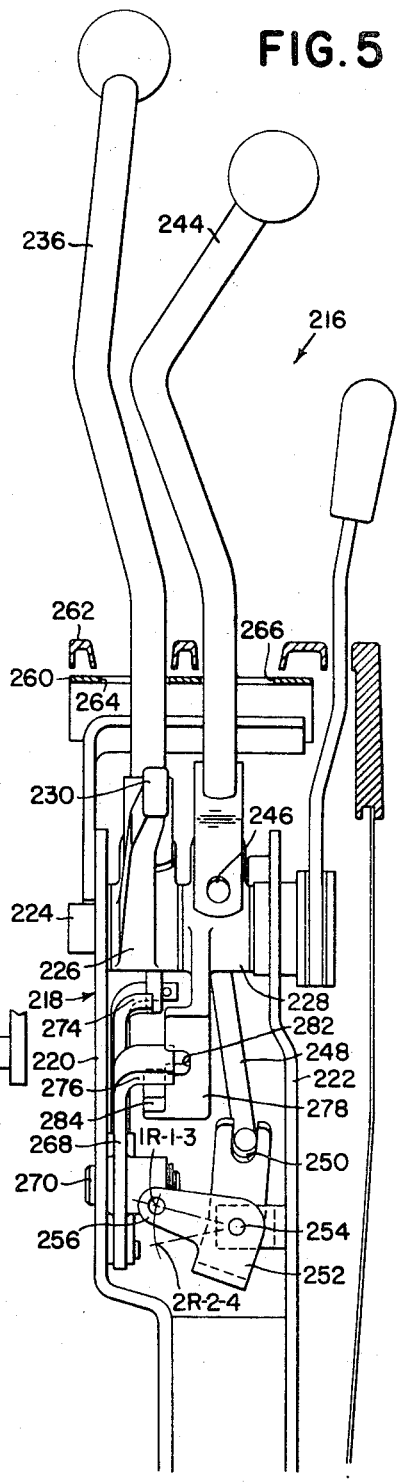
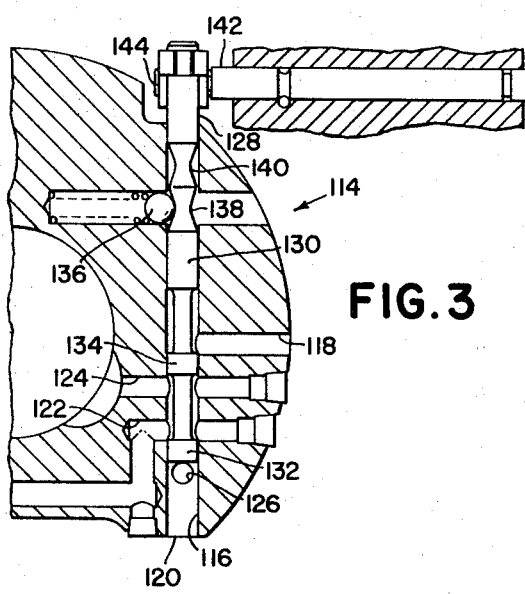

| RANGE | TRANSMISSION CONDITION | | | | TYPICAL GROUND SPEED (MPH) |
|---|---|---|---|---|---|
| | EIGHT SPEED SECTION | | PLANETARY SECTION | | |
| | GEAR | MESHES | DIRECT DR. | UNDER DR. | |
| A | 1ST | 170-156, 154-162 | — | X | 1.90 |
| | | | X | — | 2.41 |
| | 2ND | 172-160, 154-162 | — | X | 3.14 |
| | | | X | — | 4.00 |
| B | 3RD | 170-156, 158-166 | — | X | 4.37 |
| | | | X | — | 5.55 |
| | 4TH | 170-156, 160-168 | — | X | 5.19 |
| | | | X | — | 6.58 |
| C | 5TH | 172-160, 158-166 | — | X | 7.22 |
| | | | X | — | 9.18 |
| | 6TH | 170-156, 156-164 | — | X | 7.96 |
| | | | X | — | 10.100 |
| D | 7TH | 172-160, 160-168 | — | X | 8.56 |
| | | | X | — | 10.87 |
| | 8TH | 172-160, 156-164 | — | X | 13.140 |
| | | | X | — | 16.690 |
| A | R1 | 174-162 | — | X | -3.04 |
| | | | X | — | -3.86 |
| B | R2 | 174-162-154, 158-166 | — | X | -6.99 |
| | | | X | — | -8.89 |
| C | R3 | 174-162-154, 160-168 | — | X | -8.29 |
| | | | X | — | -10.53 |

FIG. 7

TRANSMISSION AND CONTROLS THEREFOR

BACKGROUND OF THE INVENTION

The present invention relates to a change-speed transmission and controls therefor and more particularly relates to an improvement of the transmission and controls respectively disclosed in U.S. Pat. Nos. 2,710,546 and 2,772,652 issued to DuShane et al. on the respective dates of 14 June 1955 and 4 Dec. 1956.

The transmission disclosed in the first-mentioned DuShane et al patent is particularly suited for use in tractors and includes parallel arranged input, output and countershafts carrying constant-mesh gearing. The input shaft carries a first clutch selectively operable for causing the countershaft to be respectively driven at high and low speeds. The first clutch includes synchronizing means permitting the clutch to be operated with the vehicle in motion so that "up" or "down" shifting is permitted on the "go."

The output shaft carries second and third clutches which are selectively operable for establishing four different driving conditions between the countershaft and the output shaft whereby the latter may be driven at four different speeds for every speed of the countershaft. Thus, eight different output speeds are available through selective operation of the three clutches.

Only four of the eight forward speeds produce ground speeds in the working or 3-8 mph range. These four speeds are adequate for some operations but for many operations the speeds are too widely spaced to permit the tractor to be operated at or near a maximum speed for a given load imposed thereon. Also, since only the first clutch is operable on the go, the operator for some conditions must frequently stop the vehicle to change the driving relationship between the countershaft and output shaft.

The transmission controls disclosed in the second-mentioned DuShane et al. patent includes first, second and third rotatable cam plates which are respectively connected to the first, second and third clutches for operating the clutches. The cams are selectively manually rotated through linkages including a pair of concentric rotatably mounted cylinder segments respectively forming speed and range shift drums. The drums include overlapped notched portions through which a shift lever projects, the lever being selectively movable sideways between the notches in the drums and being swingable fore-and-aft to cause rotation of the drum containing the notch in which the lever is received.

The speed shift drum is rotatable among four different shift stations for operating the second and third cams for establishing the four different driving conditions between the countershaft and output shaft. Whenever the speed shift drum is in one of the four stations, the lever is engageable with the range shift drum to rotate the latter between two positions for operating the first cam for establishing the two different driving conditions between the input shaft and countershaft.

While the transmission controls are acceptable for the most part, the operation is somewhat rough and noisy since the lever must be brought into engagement with the shifter drums.

SUMMARY OF THE INVENTION

According to the present invention, there is provided an improved transmission and control construction for overcoming the above-mentioned shortcomings of the DuShane et al patented transmission and control designs. Specifically, it is an object of the invention to modify the DuShane et al transmission such that twice as many forward speeds are available, including twice as many available on the "go," while at the same time retaining the major design concepts of the DuShane et al transmission. Similarly, it is an object of the invention to modify the DuShane et al controls to be compatible with the modified transmission and smoother and quieter in operation while at the same time retaining the major design concepts of the DuShane et al controls.

A more specific object is to provide a two-speed planetary transmission section having an input connected to the engine output shaft and having an output coupled to the input shaft of an eight-speed transmission section constructed according to the concept of the DuShane et al transmission, the planetary transmission section being power-shiftable between direct and underdrive conditions. Together with this object, it is an object to provide a control linkage including a first lever movable fore-and-aft among four different stations for operating clutches corresponding to the second and third clutches of the DuShane et al transmission, and a second lever movable fore-and-aft between first and second positions for operating a clutch, corresponding to the first clutch of the DuShane et al transmission, and movable sideways between third and fourth positions for causing clutch and brake means, associated with the planetary transmission section, to be power shifted to establish direct or underdrive conditions in the transmission section. A further object is to construct the linkage controlled by the above-described second lever such that the lever may be simultaneously moved fore-and-aft and sideways to accomplish simultaneous shifting in the eight-speed transmission section and the planetary transmission section.

Another object is to provide indicia so that an operator can visually discern the approximate ground speed obtainable for each of the sixteen forward speeds so that he will know where to shift to obtain either the next highest or next lowest speeds from the one in which the tractor is operating.

These and other objects will become apparent from the following description and the appended drawing.

BRIEF DESCRIPTION OF THE DRAWINGS

FIG. 3 is a longitudinal sectional view of the control valve for routing actuating fluid to and from the clutch and brake means of the planetary transmission section.

FIG. 5 is a right side view of FIG. 4 but with the housing broken away and some elements omitted.

FIG. 6 is a developed top view showing the shift lever quadrant and associated indicia in the same plane.

FIG. 7 is a table showing selected conditions of the transmission and typical ground speeds respectively obtainable for each condition.

DESCRIPTION OF THE PREFERRED EMBODIMENT

Figure 1:
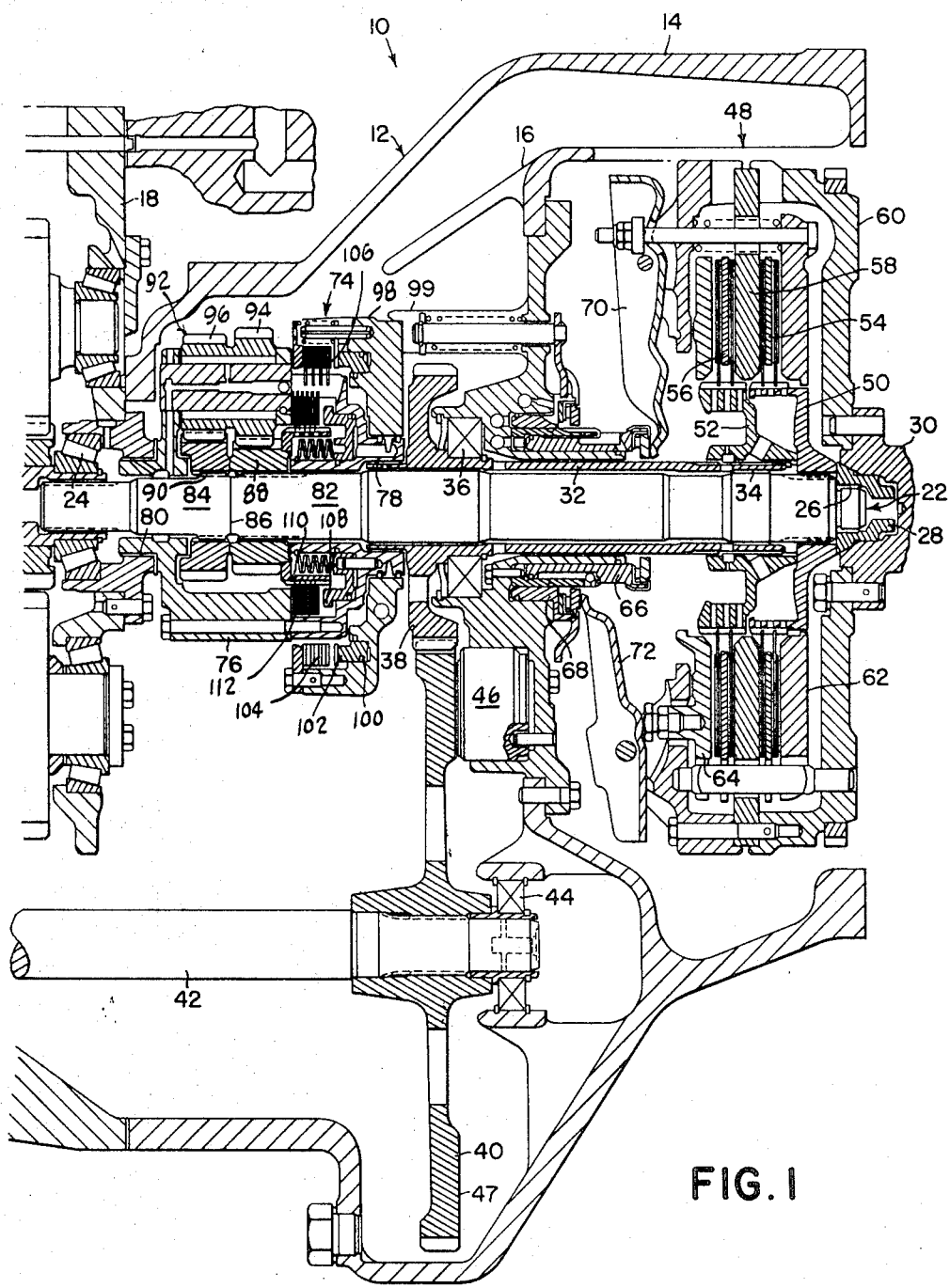
FIG. 1 is a longitudinal sectional view of a vehicle transmission showing that portion located adjacent the vehicle engine output shaft and including the planetary transmission section of the present invention.
Figure 2:
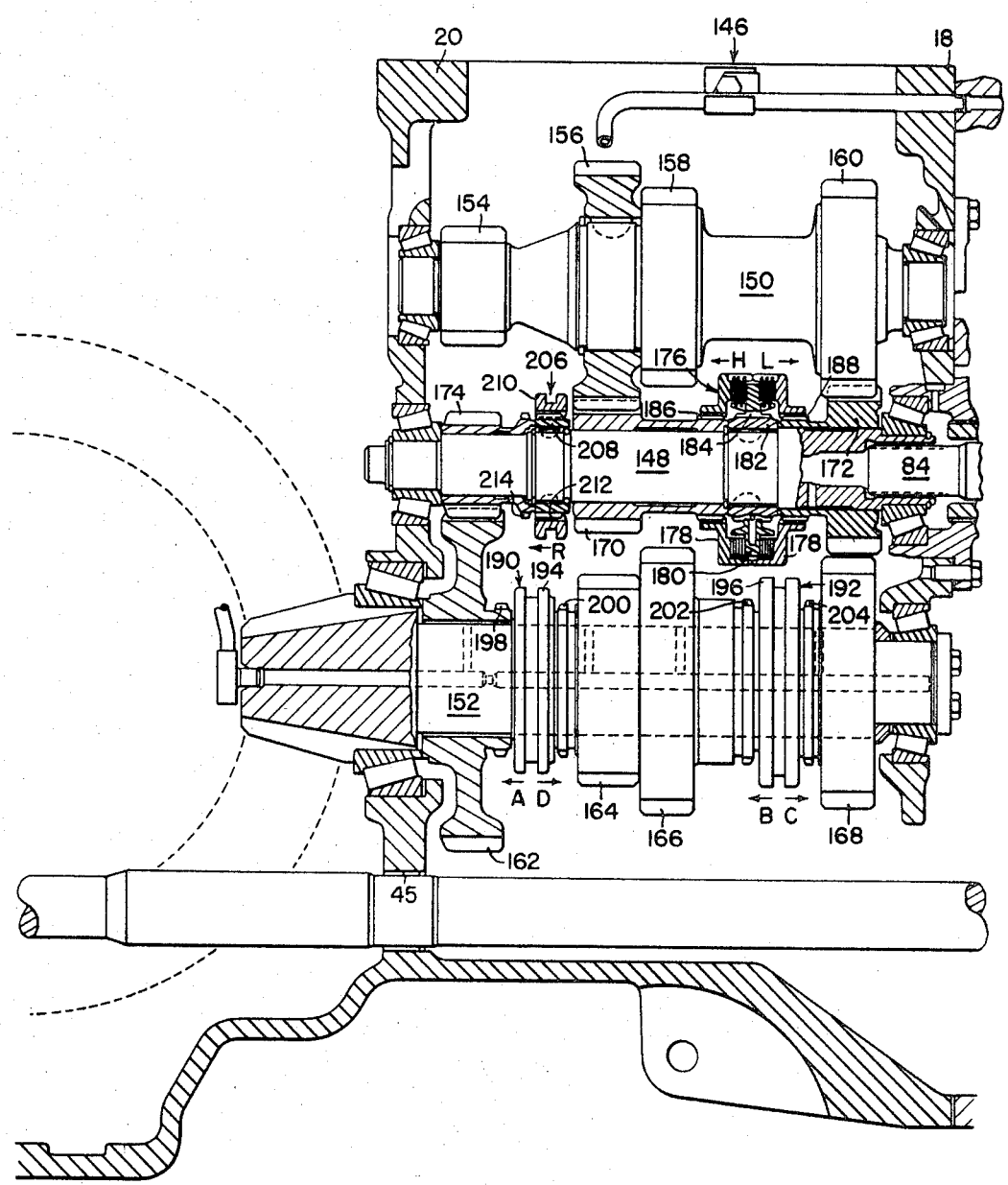
FIG. 2 is a longitudinal sectional view of the vehicle transmission shown in FIG. 1 but showing the portion including the eight-speed transmission section of the present invention.

Referring now to FIGS. 1 and 2 of the drawing, therein is shown a vehicle transmission indicated in its entirety by the reference numeral 10. The transmission 10 includes a housing 12 including a generally cylindrical clutch housing portion 14 at its right end as viewed in FIG. 1. The left end of the housing portion 14 is delimited by a support wall 16, and spaced leftwardly from the support wall 16, as viewed in FIG. 1, is an intermediate support wall 18 which cooperates with a left end support wall 20, as viewed in FIG. 2, to provide support means for various transmission shafts to be described hereinafter.

With reference to FIG. 1, a traction input drive shaft 22 including left and right pieces extends axially within the clutch housing portion 14, the left piece being supported at its left end by a bearing 24 located in the support wall 18 and the right piece being supported at its right end by a bearing 26 located within a bushing 28 which is in turn fixed within a receptacle extending axially into the end of an engine crankshaft shown partially at 30. The traction input drive shaft 22 is received within a hollow power take-off (hereinafter abbreviated as PTO) input drive shaft having its right end supported by the shaft 22 as at a bearing 34, and having its left end supported as at a bearing 36 located within the support wall 16. The left end of the shaft 32 comprises an integrally formed gear 38 which is meshed in driving relationship with a gear 40, the gear 40 being fixed to a power take-off shaft 42 having its right end supported as at a bearing 44 fixed in the support wall 16. The power take-off shaft 42 extends through and is rotatably supported in the left end support wall 20 as at a bearing 45. A hydraulic brake piston 46 is axially shiftably mounted in the support wall 16 for selective braking engagement with an annular surface 47 formed on the gear 40.

Located in the clutch housing portion 14 is a dual clutch assembly 48. The dual clutch assembly 48 includes a traction clutch member 50 including a hub fixed for rotation with the traction input drive shaft 22 and a PTO clutch member 52 including a hub located axially adjacent the hub of the traction clutch member and being fixed for rotation with the power take-off input drive shaft 32. The hubs of the traction and PTO clutch members 50 and 52 respectively carry annular, axially shiftable friction elements 54 and 56. A backing plate 58 of annular shape is located between the traction clutch and power take-off clutch friction elements 54 and 56 respectively and is fixed to the rim portion of a flywheel 60 which is in turn fixed to the engine crankshaft 30. Respectively located on the opposite sides of the traction clutch and PTO clutch friction elements 54 and 56 from the backing plate 58 are a traction clutch pressure plate 62 and a PTO clutch pressure plate 64. The pressure plates 62 and 64 are mounted, in a manner well known in the art, for rotation with the flywheel 60 as well as for axial movement toward and away from the friction elements 54 and 56 to frictionally engage the latter with the backing plate 58. The pressure plates 62 and 64 are normally biased away from engagement with friction elements 54 and 56.

Actuating means are provided for shifting one or the other or both of the pressure plates 62 and 64 toward the backing plate 58 to respectively establish a driving relationship between the engine crankshaft 30 and one or the other or both of the traction and PTO input shafts 22 and 32, respectively, via the traction and PTO clutch friction elements 54 and 56. The actuating means includes annular ring-like hydraulic traction and PTO clutch actuating pistons 66 and 68 respectively. The pistons 66 and 68 are mounted in the support wall 16 in concentric relationship to each other and to the drive shafts 22 and 32. When pressure fluid is introduced at the left ends of the pistons 66 and 68, they shift rightwardly and respectively engage the inner ends of sets of radially extending traction clutch and power take-off clutch operating fingers, one of each set being respectively shown at 70 and 72. The sets of fingers 70 and 72 are arranged circularly about and are pivotally connected to the flywheel 60 and are respectively operatively connected to the pressure plates 62 and 64 for causing the latter to move the friction elements 54 and 56 into engagement with the backing plate 58 when the actuating pistons 66 and 68 are pressurized.

A two-speed planetary transmission section 74 is located in the housing 12 between the PTO drive gear 38 and the support wall 18. The planetary transmission section includes a carrier 76 having its right end journally supported on the hub of the gear 38, as at 78, and having its left end journally supported in the support wall 18, as at 80. The traction input drive shaft 22 is divided into an input section 82 and an output section 84, the sections 82 and 84 being in end-to-end abutment as at line 86. Respectively mounted on the shaft sections 82 and 84 for rotation therewith are side-by-side disposed input and output sun gears 88 and 90, respectively. A planet cluster gear 92 is rotatably mounted on the carrier 76 and includes gears 94 and 96 respectively meshed with the input and output sun gears 88 and 90. A support member 98 generally borders the right side of the planet carrier 76 and is integrally fixed to the partition wall 16 as at a wall portion 99 which extends annularly about the PTO drive gear 38. A ring-like brake actuating piston 100 is axially shiftably mounted in the support member 98 for movement toward the planet carrier 76 to move an annular pressure plate 102, also axially shiftably mounted on the support member 98, to bring friction elements 104 carried by the support member 98 into braking engagement with braking plates 106 carried by the carrier 76. Thus, actuation of the piston 100 causes the carrier 76 to be braked against rotation resulting in a condition wherein the power flows from the shaft section 82 through the input sun gear 88, and thence to the planet cluster 92 and out to the output shaft section 84 via the output sun gear 90. It is here noted that the planetary gearing is chosen such that the above-described condition of the planetary transmission section results in an underdrive situation wherein the output section 84 of the shaft 22 is driven at a slower speed than the input section 82 of the shaft 22.

A ring-like clutch actuating piston 108 is axially shiftably mounted in the carrier 76 for movement toward and for causing interengagement among friction disc elements 110 and 112 respectively carried by the input sun gear 88 and the carrier 76. Thus, when the clutch piston 108 is actuated, the input sun gear 88 is locked to the carrier 76 causing the output section 84 of the shaft 22 to turn at the speed of the input section 82 of the shaft 22. In other words, a direct drive condition is at a speed determined by the ratio between the pitch diameters of the meshing and driving countershaft and output gears. For selectively establishing driving connections between the gears, the output shaft carries thereon first and second output shaft clutches 190 and 192, which are of similar construction. Specifically, the clutches 190 and 192 respectively include central rings, not shown, keyed to the output shaft intermediate the output gears 162 and 164 and intermediate the output gears 166 and 168. The internal rings are externally splined and the clutches 190 and 192 respectively include internally splined external rings 194 and 196 which are axially shiftably mounted on the splines of the internal rings. The external ring 194 is shiftable in the direction of the arrow A to bring the internal splines thereof into driving engagement with teeth 198 formed on the hub of the gear 162 to establish a slow range of driving speeds in the transmission, as will be further explained below. Similarly, the external ring 194 is shiftable in the direction of the arrow D to drivingly engage teeth 200 formed on the hub of the gear 164 for establishing a transport range of speeds in the transmission. The external ring 196 is likewise oppositely axially shiftable in the direction of the arrows B and C to respectively drivingly engage teeth 202 on the hub of the gear 166 and teeth 204 on the hub of the gear 168 to respectively establish intermediate and transport ranges of speeds in the transmission. Hereinafter the letters A, B, C and D will sometimes be used to respectively designate the slow, intermediate, fast and transport ranges of speeds just mentioned.

Referring now to the table illustrated in FIG. 6, it can be seen that in each of the ranges of speeds A, B, C and D, that four different forward ground speeds may be established, thus making 16 forward ground speeds possible. For example, with the output gear 162 being fixed to the output shaft for establishing the condition wherein the A range of speeds is available, a first speed is obtainable by fixing the input pinion 170 to the input shaft while at the same time placing the planetary transmission section in its underdrive condition; a second speed is obtainable in a manner similar to that for obtaining the first speed but by placing the planetary transmission section in its direct drive condition; a third speed is obtainable by fixing the input pinion 172 to the input shaft while at the same time placing the planetary transmission section in its underdrive condition; and, a fourth speed may be obtained in a manner similar to that for obtaining the third speed but by placing the planetary transmission section in its direct drive condition. Thus, it will be appreciated that once the operator has selected, through means of the output clutches 190 and 192, the range of speeds in which he wishes to operate, he may obtain the four ground speeds available in each range on the go by selective operation of the planetary clutch and brake piston control valve 114 and the countershaft speed selector clutch 176. It is to be understood that the shifting among the four speeds within each of the range of speeds may be in the nature of either up or down shifts through a sequence to be described hereinafter.

The eight-speed transmission section 146 is placed in condition for producing a reverse output by means of a reverse clutch 206 located on the input shaft 148 between the low speed input pinion 170 and the reverse pinion 174. The reverse clutch 206 is similar in construction to the output clutches 190 and 192 and includes an internal ring 208 keyed to the shaft 148. An external ring 210 is axially shiftably splined, as at 212, to the internal ring and is shiftable in the direction of the arrow R to drivingly engage teeth 214 located on the hub of the reverse pinion 174. With this engagement being established, the output shaft 152 may be driven at different reverse speeds by selectively fixing the output gears 162, 164, 166 and 168 to the output shaft through selective actuation of the output clutches 190 and 192. Two speeds of course are made available for each selection of the gear according to whether the planetary transmission section is in a direct or underdrive condition.

Figure 4:
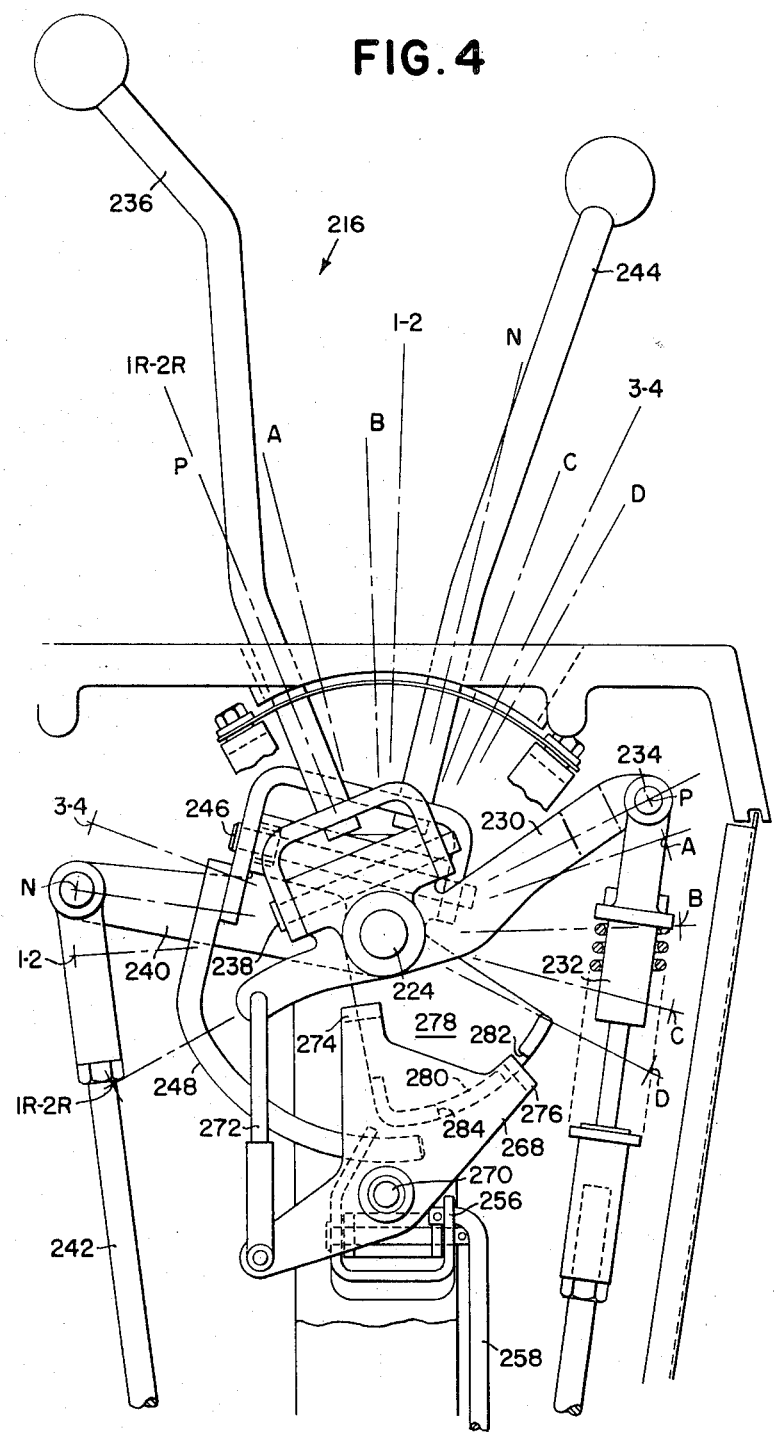
FIG. 4 is a side elevational view of the transmission control levers and associated linkage.

Referring again to FIG. 6, it is to be noted that the slower speeds of the C range of speeds overlap the faster speeds of the B range of speeds and that the slower speeds of the D range of speeds overlap the faster speeds of the C range of speeds. This overlap of speeds has a significant bearing on the control design to be presently described. For the purpose of controlling the condition of the transmission thus far described, there is provided control linkage means including an input shift linkage section 216 and an output shift linkage section (not shown), the input shift linkage section being shown in FIGS. 4–6. The input shift linkage section would normally be located at the operator's station of a tractor and would extend from there to the exterior of the transmission housing whereat it is connected to the output shift linkage section. While the output shift linkage section could be any construction capable of causing selected shifting of the planetary clutch and brake piston control valve 114, the countershaft speed selector clutch 176, the output clutches 190 and 192 and the reverse clutch 206 in response to selected positions of the input shift linkage section 216, it is preferred that that portion of the output shift linkage section which controls the eight-speed transmission section be of a construction including a range cam and a speed cam arranged and operated as disclosed in the DuShane et al. U.S. Pat. No. 2,772,652, mentioned above.

The input shift linkage section 216 includes a support structure 218 including vertical, transversely spaced support plates 220 and 222, the plate 220 being to the right of the plate 222 when considered by one facing in the direction of travel. A transverse horizontal support shaft 224 extends between and has its opposite ends supported by the plates 220 and 222, the shaft rotatably supporting, in side-by-side relationship, a speed range selector bellcrank 226 and a high and low speed selector bellcrank 228. The bellcrank 226 includes a forwardly projecting arm 230 having a motion-transmitting link 232 pivoted to the end thereof as at pin 234. The bottom end of the motion-transmitting link 232 is connected to linkage of the output shift linkage section which controls the shifting of the output clutches 190 and 192. Specifically, when the bellcrank 226 is in a tow position between the C and D positions, the motion-transmitting link 232 will cause the output shift linkage section to hold the output clutches 190 and 192 in their respective neutral positions shown. If the bellcrank 226 is then rotated to place the end of the arm 230 at the positions indicated at A, B, C and D, the motion-transmitting link 232 will cause the output shift linkage section to correspondingly shift the output clutches 190 and 192 in the directions of the arrows A, B, C and D, it being understood that as one of the clutches 190 and 192 is engaged, the other is disenestablished in the planetary transmission section 74 when the clutch actuating piston 108 is actuated.

For the purpose of controlling the flow of actuating fluid to and from the planetary brake and clutch pistons 100 and 108, respectively, a control valve 114 is provided in the support member 98. As viewed in FIG. 3, the control valve 114 includes a vertical valve bore 116 intersected by an upper sump port 118 and having a lower bottom end forming a lower sump port 120. A pressure fluid inlet port 122 intersects the bore approximately midway between the upper and lower sump ports, a clutch control port 124 is located between the upper sump port 118 and the fluid inlet 122, and a brake control port 126 is located between the lower sump port 120 and the fluid inlet 122. A valve spool member 128 is slidably mounted in the valve bore 116 and includes upper, lower and intermediate lands 130, 132 and 134, respectively. The valve spool member 128 is shown positioned for routing fluid pressure to the planetary clutch actuating piston 108. In this position, the lower land 132 is located between the inlet and lower sump ports 122 and 120, respectively, while the intermediate land 134 is located between the clutch control and upper sump ports 124 and 118, respectively. In order to disengage the clutch and engage the brake, the valve spool member 128 is shifted downwardly from the position shown to a lower position wherein the lower land 132 is located between the brake and lower sump ports 126 and 120, respectively, and wherein the intermediate land 134 is located between the inlet and clutch control ports 122 and 124, respectively. The valve spool member 128 is respectively held in its operative position by means of a spring biased detent ball 136 which alternately engages lower and upper detent depressions 138 and 140, respectively, when the spool member 128 is in its upper and lower operative positions. For the purpose of moving the valve spool member 128 between its detented positions, a rotatable control rod 142 is linked to the top of the spool member, as at 144.

Referring now to FIG. 2, the transmission 10 includes an eight-speed transmission section 146 located between the support walls 18 and 20 and including parallel arranged input, counter and output shafts 148, 150 and 152, respectively, these shafts having their opposite ends respectively rotatably mounted in the support walls 18 and 20. The right end of the input shaft 148 is fixed for rotation with the output section 84 of the traction input drive shaft 22. It is noted that the countershaft 150 is shown displaced upwardly from its true position in order that the structure thereof may be more readily perceived.

Proceeding from left to right, the countershaft 150 has axially spaced thereon and fixed thereto a small countershaft gear 154, a large countershaft gear 156, a first intermediate countershaft gear 158 and a second intermediate countershaft gear 160, the gear 158 being smaller than the gear 160.

Bearing in mind that the countershaft 150 is not in its true position, the output shaft 152 has independently journaled thereon a larger output gear 162, a small output gear 164, a first intermediate output gear 166 and a second intermediate output gear 168, these gears being respectively in constant mesh with the countershaft gears 154, 156, 158 and 160.

The input shaft 148 has journaled thereon a low-range or speed input pinion 170 and a high-range or speed input pinion 172. The input pinion 170 is in constant mesh with the larger countershaft gear 156 and the input pinion 172 is in constant mesh with the second intermediate countershaft gear 160. Also journaled on the input shaft is a reverse pinion 174 which is in constant mesh with the large output gear 162. Since the output gear 162 is in constant mesh with the small countershaft gear 154, it follows that positive connection of the reverse pinion 174 to the input shaft 148 will drive the countershaft in a reverse direction, whereas positive connection of the input shaft to either of the input pinions 170 and 172 will drive the countershaft in a forward direction at one or the other of two different range or speed ratios.

For the purpose of selectively establishing either a low or a high range driving connection between the input shaft 148 and the countershaft 150, the transmission includes a dual-speed or range selector clutch 176 located between the input pinions 170 and 172. The dual-range clutch 176 includes a pair of synchronizer rings 178 located at the opposite sides of a synchronizer member 180, the latter being splined to a hub 182 as at 184. One of the synchronizer rings 178 is splined as at 186 to the input pinion 170 while the other synchronizer ring 178 is splined as at 188 to the input pinion 172. When the synchronizer rings 178 are shifted in the direction of an arrow L, synchronization occurs between the rear ring 178 and the synchronizer member 180, after which the splined connection at, 186 is carried over the splines 184 on the hub 182. Thus, the hub 182, the low range pinion 170 and a rear synchronizer ring 178 are connected for rotation in unison. This positively connects the low-range pinion 170 to the input shaft 148. Shifting of the synchronizer rings 178 in the opposite direction, in the direction of an arrow H, first synchronizes the front ring 178 and the synchronizer member 180 and causes positive engagement between the high-range pinion 172 and input shaft hub 182 by means of carrying over the splined connection at 188 to the hub splines 184.

When the countershaft speed selector clutch 176 effects engagement between the input shaft and the input pinion 170, for example, the countershaft is driven at a speed determined by the relative pitch diameters between the pinion 170 and the large countershaft gear 156. Likewise, when the clutch 176 is shifted to affect a positive connection between the input shaft and the large input pinion 172, the countershaft will be driven at a higher speed determined by the ratio between the pitch diameters of the pinion 172 and the intermediate countershaft gear 160. Operation of the clutch 176 in one direction or the other is exclusive as well as selective; that is to say, both pinions 170 and 172 cannot be simultaneously connected to the input shaft.

Since the input shaft 148 may be driven at either one of two speed ratios by the planetary transmission section described above and the countershaft may in turn be driven at either one of the two speed ratios mentioned above, it follows that any variety of selective speeds taken off from the countershaft may be quadrupled, which is just the result accomplished here. As previously outlined, the countershaft gears 154, 156, 158 and 160 are respectively in constant mesh with the output gears 162, 164, 166 and 168. Therefore, if any one of the output shaft gears is positively connected to the output shaft, the output shaft will rotate gaged. The bellcrank 226 is rotated by means of a speed range shift lever 236 pivotally connected thereto by means of a fore-and-aft extending pivot pin 238 having a purpose to be described below.

The high and low speed selector bellcrank 228 includes a rearwardly extending arm 240 to the end of which is connected the top end of a motion-transmitting link 242, the bottom end of the link 242 being connected to linkage in the output shift linkage section for controlling the shifting of the countershaft speed selector clutch 176 and the reverse clutch 206 in response to the bellcrank 228 being rotated among its operative positions. Specifically, when the bellcrank 228 is in its neutral position as illustrated and indicated by the letter N appearing at the end of the arm 240, the motion-transmitting link 242 will act on the output shift linkage section to cause the clutches 176 and 206 to be maintained in their neutral positions as shown. When the bell-crank 228 is rotated to selectively place the end of the arm 240 in the positions indicated at 1R–2R, 1–2, and 3–4, the motion-transmitting link 242 will act on the output shaft linkage section to cause it to respectively individually shift the reverse clutch 206 in the direction of the arrow R and shift the countershaft speed selector clutch 176 in the directions of the arrows H and L. A high and low speed shift lever 244 having a forked bottom end is provided for rotating the bellcrank 228 about the shaft 224 and is connected to the bellcrank through means of a fore-and-aft extending pivot pin 246 which passes through the forked bottom end of the lever. Fixed to the rearward portion of the forked bottom end of the lever 244 is a rod 248 which extends downwardly and is curved forwardly along a radius of the shaft 224. The rod 248 is received in an upwardly opening notch 250 which is located in the end of an upwardly extending arm of a member 252 which is pivoted as at a pin 254 for sideways swinging movement. The member 252 includes a laterally extending arm 256 to the end of which is connected the upper end of a motion-transmitting link 258 having at the bottom end connected, in a manner not shown, to the control rod 142 to cause the latter to rotate and move the control valve 114 between its alternate positions. Specifically, when the arm 256 is in the illustrated position having the designation 1R–1–3, the motion-transmitting link 258 will be positioned such as to permit the control valve 114 to be retained in the illustrated position by means of the detent ball 136, the planetary transmission section then being in its underdrive condition. When the arm 256 is rotated to the position designated at 2R–2–4, the motion-transmitting link 258 will cause the control rod to be rotated to move the valve to its alternate position wherein the planetary transmission section is placed in its direct drive condition. It is to be here noted that pivot 246 permits the high and low speed shift lever 244 to be moved sideways to cause the pivoting of the member 252 without causing any pivoting motion to be incurred by the selector bellcrank 228.

Fixed above the support shaft 224 and located at a constant radius therefrom is an arcuate plate 260 directly above which is fixed a fore-and-aft extending control console cover member 262. The arcuate plate forms a shift quadrant containing fore-and-aft extending guide slots 264 and 266 in which the speed range shift lever and a high and low speed shift lever are respectively received, the slots 264 and 266 being shaped, as will be further described below, to control the fore-and-aft movement of the shift levers. The shift levers 236 and 244 also project up through the cover member 262 which is of course also slotted to permit the shift levers to move freely within the guide slots 264 and 266.

As can best be seen in FIG. 6, the guide slot 264 is shaped to define five distinct shift positions which from the rear to the front of the slots are indicated by the letters P, A, B, C and D located along the right margin of the slot. These letters indicate the corresponding condition of the eight-speed transmission section and thus it can be seen that the lever 236 may be selectively shifted to sequentially establish either higher or lower speed ranges in the eight-speed transmission section. Similarly, the slot 266 guides the shift lever 244 among operative positions to sequentially select higher or lower operating speeds in the transmission. Specifically, the guide slot 266 defines a path including parallel rear, intermediate and forward transversely extending portions respectively defining lever operating positions at their right sides, as indicated by the members and/or letters 1R, 1 and 3, and their left sides, as indicated by 2R, 2 and 4, the right positions 1R and 1 being interconnected by a fore-and-aft extending portion and the left and right positions 2 and 3 being interconnected by a diagonal portion. Thus, the shift lever traces a Z-shaped path as it moves from the 1 to the 4 position. Intermediate the ends of the diagonal portion is a neutral position indicated at N. Thus it will be appreciated that for each of the speed ranges that can be selected by shifting the speed range shift lever 236 among its operative positions, the high and low speed shift lever may be sequentially shifted among the positions indicated at 1, 2, 3 and 4 to cause a sequential increase or decrease in the driving speed of the countershaft 150, hence increasing or decreasing the speed of the output shaft 152.

For safety purposes, an interlock is provided for preventing the speed range shift lever 236 from being moved to its transport range position D when the high and low speed shift lever 244 is in either one of its reverse positions 1R and 2R, and vice versa. Also, the interlock prevents the shift lever 236 from being shifted to its park position P unless the shift lever 244 is first placed in its neutral position N. Specifically, there is provided a plate-like interlock member 268 which is located below the speed range selector bellcrank 226 and is pivotally supported from the support plate 220, as at a stub shaft 270, for fore-and-aft pivoting movement, this movement being caused by pivoting movement of the bellcrank 226 which is transferred to the interlock member 268 by means of a link 272 having its opposite ends respectively pivoted the interlock member and the bellcrank. The interlock member 268 includes a D range interlock tab 274 and a park interlock tab 276, the tabs being arcuately spaced from each other about the axis of the stub shaft 270 and projecting leftwardly towards the left support plate 222. It is here to be noted that the tab 274 is longer than the tab 276 for a purpose to be presently described. The interlock means includes a second plate-like interlock member 278 which forms an integral part of the high and low speed selector bellcrank 228 and includes an arcuate rim 280 which projects rightwardly towards the interlock member 268. The rim 280 has a tab-receiving notch 282 formed therein, which when the speed shift lever 244 is in its neutral position, as illustrated, permits passage of the park interlock tab 276 to permit the speed range shift lever 236 to be moved to the park position, as illustrated, wherein the clutches 190 and 192 are respectively positioned to engage the gears 162 and 168. The speed shift lever 244 then cannot be moved from its neutral position without the speed range shift lever 236 first being moved from its park position. The rim 280 is stepped outwardly towards the interlock member 268 thus forming a tab abutment 284 which, when the shift lever 244 is in one or the other of its reverse positions, is located in the path of the relatively short D range interlock tab 274 to prevent the speed range shift lever 236 from being moved to its transport or D range position. In the case where the shift lever 236 is already in the D range position, the tab abutment 284 prevents the shift lever 244 from being moved to either one of its reverse positions.

Referring again to FIG. 6, therein is shown indicia which forms an important feature of the present invention. Specifically, for the purpose of indicating to the operator, the approximate forward ground speeds respectively obtainable for each of the forward operating conditions of the transmission, there is provided, at the right side of a decal 286, or the like, a fore-and-aft extending column of numbers 288 which here represent approximate ground speeds in miles per hour, the numbers increasing from the rear to the front of the decal. Located to the left of and extending parallel to the column of numbers 288 are four columns of numbers 290, 292, 294 and 296, each of which consist of the numbers 1, 2, 3 and 4 and respectively which appear to be located in respective paths leading to the letters D, C, B and A. The numbers 1, 2, 3 and 4 of each of the columns represent the four speeds obtainable in the speed range represented as being located in the same path as the number and the numbers are positioned such that they are located directly across from the number in the column 288 which corresponds to the approximate ground speed obtainable when the transmission is in the condition represented by the range and speed selected. The aforementioned overlap in the speeds obtainable when the transmission is in the respective conditions for operating in the B, C and D ranges of speeds is clearly apparent from the overlap of the numbers in the columns 290, 292 and 294. It is here that the indicia is particularly helpful in aiding an operator. For example, if the range selector shift lever is in the B position and the speed shift lever is in the 3 position and the operator for some reason desires to place the transmission in a condition for producing the next lower speed, he can readily see that the 2 in the column located in the path containing the letter C is the closest from the rear of the decal to the numeral 3 in the column located in the path containing the letter B and, thus that he must shift the lever 236 to its C position and lever 244 to its 2 position to place the transmission in the desired condition.

The operation of the transmission and control therefor may be best undestood from a description of a complete cycle of speed and range selection. To begin with, it is assumed that all of the components are in their respective positions illustrated and it is desired to shift the transmission to obtain the lowest forward ground speed. Ignoring for the present the effects of whether or not the main traction clutch 50 is engaged or disengaged, the speed range shift lever 236 is first moved from its park position P to its low range position A. The movement of the lever 236 from its park position P to its position A involves a fore-and-aft component which results in the speed range selector bellcrank 226 being rotated a distance for transmitting, via the link 232, sufficient motion to the output shift linkage section for causing the output clutch ring 196 to be shifted in the direction of the arrow B (FIG. 2) from the neutral position shown. The movement of the bellcrank 226 simultaneously, via the link 272, rotates the interlock member 268 a distance sufficient to remove the park interlock tab 276 from the tab-receiving notch 282. The high and low speed shift lever 244 is then shifted to obtain the lowest speed within the speed range A by moving it from its neutral position to its 1 position. The lever 244 is then in the right side of the slot 266, as viewed in FIG. 6, and thus acts through the curved rod 248 to hold the member 252 in the position illustrated whereat the motion-transmitting link 258 maintains the planetary clutch and brake piston control valve 114 in its lower position illustrated wherein the brake actuating piston 100 of the two-speed planetary transmission section 74 is actuated causing an underdrive condition in the planetary transmission section. It is also to be noted that the fore-and-aft position of the shift lever 244 in the slot 266 is that at which the motion-transmitting link 242 acts on the output shift linkage section to actuate the countershaft speed selecting clutch 176 in the direction of the arrow L to cause the gear 170 to be rotated with the input shaft 148.

In order to shift to the next highest speed within the A range, it is necessary only to swing the shift lever 244 laterally in the guide slot 266 from the 1 to the 2 position. This sideways movement of the lever 244 causes the arcuate rod 248 to swing in the opposite direction and cause the member 252 to be pivoted downwardly to its 2R–2–4 position, which downward swinging causes the motion-transmitting link 258 to be shifted to cause rotation in the control rod 142 which in turn shifts the control valve 114 to its alternate position wherein the clutch actuating piston 108 is actuated causing a direct drive condition in the planetary transmission section 74. If it is then desired to operate at the third speed within the A range, the operator shifts the lever 244 diagonally from the 2 position to the 3 position. The movement of the shift lever 244 from the left side to the right side of the guide slot 266 acts via the rod 248 and the member 252 to produce motion in the link 258 which causes the control valve 114 to be once again returned to the position whereat fluid pressure is directed to the brake actuating piston 100 to place the two-speed planetary transmission section 74 in its underdrive condition. At the same time, the fore-and-aft movement of the shift lever 244 transmits sufficient motion via the bellcrank 228 and the motion-transmitting link 242 for causing the output shift linkage section to shift the countershaft speed selector clutch 176 in the direction of the letter H to cause the gear 172 to be fixed for rotation with the input shaft 148.

The fourth speed in the A range of speeds can then be obtained by shifting the lever 244 leftwardly from the 3 position to the 4 position to again cause the motion-transmitting link 258 to be moved via the rod 248 in the member 252 to in turn cause the control rod 142 to be rotated to shift the planetary clutch and brake piston control valve 114 to its upper position wherein the clutch of the two-speed planetary transmission section is actuated for causing the planetary transmission section to operate in its direct drive condition.

Thus, the lever 244 can be shifted among its positions 1, 2, 3 and 4 in sequence. The 1–2, 2–1, 3–4 and 4–3 shifts can be made without actuation of the main traction clutch member 50. The 2–3 and 3–2 shifts are made through actuation of the main traction clutch member 50 and may be made on the go, with the benefit of the synchronizers 178. In other words, the lever 244 can be shifted among the positions 1, 2, 3 and 4 while the tractor is in operation or on the go.

We claim:

1. A transmission and control therefor, comprising: input, output and countershafts; multi-range drive means for driving the output shaft from the countershaft and including a first clutch shiftable among neutral, low range, and transport range positions and a second clutch shiftable among neutral, intermediate range and high range positions; a range selector means connected to said first and second clutches and including a first shift lever selectively, sequentially movable among low, intermediate, high and transport range positions for achieving corresponding positions of the first and second clutches; a first two-speed drive means for driving the countershaft from the input shaft and including a third clutch shiftable among neutral, low speed and high speed positions; a two-speed transmission section being connected to the input shaft to drive the latter, the transmission section including a second two-speed drive means for driving the input shaft at low and high speeds and including a control means shiftable between low speed and high speed positions; a speed selector means connected to said third clutch and control means and including a second shift lever selectively, sequentially movable among first, second, third and fourth speed positions for respectively achieving the low speed positions of both the selector means and the third clutch, the high speed position of the selector means and the low speed position of the third clutch, the low speed position of the selector means and the high speed position of the third clutch and the high speed position of the selector means and the high speed position of the third clutch; and the speed ratios of said first and second two-speed drive means being such that the countershaft is driven at increasing speeds as the second lever is shifted from its first to its fourth position.

2. The transmission and control therefor, as defined in claim 1, wherein the brake means and first and second clutch means each include member means permitting the engagement and disengagement of the brake means and first and second clutch means while the output shaft of the eight-speed transmission is being driven from the countershaft.

3. The transmission and control therefor, as defined in claim 2, wherein the member means of each of the brake and first clutch means includes hydraulically actuated friction disc elements and the member means of the second clutch means includes a synchronizing element.

4. A transmission and control therefor, comprising: an eight-speed transmission section including input, output and countershafts; a two-speed planetary transmission section having an output shaft connected to said input shaft and having a first low and high speed drive means including a brake means and a first clutch means, each being selectively actuatable between engaged and disengaged conditions, low and high speed driving conditions respectively being established when the brake and clutch means are respectively in their engaged and disengaged conditions, and in their disengaged and engaged conditions; a low and high speed drive means for selectively driving the countershaft from the input shaft and including a second clutch means actuatable among a neutral disengaged condition and first and second engaged conditions wherein the countershaft is respectively connected for being driven at a low and at a high speed from the input shaft; multi-speed drive means for selectively driving the output shaft from the countershaft at four different speeds and including third and fourth clutch means, each being actuatable among a neutral disengaged condition and first and second engaged conditions; the first and second engaged conditions of said third clutch means respectively establishing conditions wherein the output shaft is driven at low and transport speeds from the countershaft and the first and second engaged conditions of said fourth clutch means respectively establishing conditions wherein the output shaft is driven at intermediate and high speeds from the countershaft; a high and low speed selector means for selectively engaging and disengaging the brake means and the first and second clutch means; said selector means including a first shift lever mounted for sequential movement among first, second, third and fourth operative positions for establishing respective conditions wherein the brake, first clutch and second clutch means are respectively in their engaged, disengaged and first engaged conditions, in their disengaged, engaged and first engaged conditions, in their engaged, disengaged and second engaged conditions and in their disengaged, engaged, and second engaged conditions; a range speed selector means for selectively placing the third and fourth clutch means in their respective operating conditions; said speed selector means including a second shift lever mounted for sequential movement among first, second, third and fourth operative positions for establishing respective conditions wherein the third and fourth clutch means are respectively in their first engaged and neutral conditions, in their neutral and first engaged conditions, in their neutral and second engaged conditions and in their second engaged and neutral conditions; the drive ratios of the first and second high and low speed drive means being such that the countershaft is driven at increasing speeds as the first shift lever is sequentially shifted from its first to its second, third and fourth operative positions and the drive ratios of the multi-speed drive means being such that the output shaft is driven at increasing speeds as the second shift lever is sequentially shifted from its first to its second, third and fourth operative positions.

5. A transmission and control therefor, comprising: input, output and countershafts; multi-range drive means for driving the output shaft from the countershaft and including a first clutch shiftable among neutral, low range and high range positions and a second clutch shiftable among neutral, intermediate range and high range positions; range selector means connected to said first and second clutches and including a horizontal support shaft; a first arm pivotally mounted on said support shaft for swinging thereabout; a first motion transmitting linkage means connected between said first and second clutches and said first arm; a range shift lever connected to said arm for selectively sequentially swinging the latter together therewith about said support shaft among low, intermediate, high and transport range positions for achieving corresponding positions of the first and second clutches; a first two-speed drive means for driving the countershaft from the input shaft and including a third clutch shiftable among neutral, low speed and high speed positions; a two-speed transmission section being connected to the input shaft to drive the latter, the transmission section including a second two-speed drive means for driving the input shaft at a low and high speed and including a control means shiftable among low speed and high speed positions; a speed selector means connected to said third clutch and control means and including a second arm mounted on said support shaft for swinging thereabout at a location beside said first arm; a second motion transmitting linkage connected between the second arm and said third clutch; an operating member spaced below said support shaft and pivotally mounted for swinging about an axis extending crosswise to said support shaft and including an upwardly opening notch; a third motion transmitting linkage means connected between said operating member and said control means; a speed shift lever pivotally connected to said second arm for swinging transversely to the direction of and independently of the swinging of said second arm, and for swinging in the direction of swinging of said second arm for causing the movement of the latter; said speed shift lever having a downwardly extending portion received in said notch of the operating member; said speed shift lever being swingable, in the direction of swinging of said second arm, between a first set of low and high speed positions for achieving corresponding positions in said third clutch; and said speed shift lever when in either of said first set of positions being swingable crosswise to the direction of swinging of said second arm between a second set of low and high positions for swinging said operating member and for achieving corresponding positions in said control means.

6. The transmission and control therefor defined in claim 5 wherein said speed shift lever is movable between the high speed position of the first set of low and high speed positions and the low speed position of the second set of low and high speed positions whereby the third clutch and the control means are simultaneously actuated.

7. The transmission and control therefor as defined in claim 5 and further including a reverse drive means for selectively driving said output shaft from the input shaft, when the first clutch is in the low range position, and from the countershaft, when the second clutch is in the intermediate range and fast range positions; said reverse drive means including a reverse clutch shiftable between a neutral and a reverse position; said speed shift lever also being swingable to neutral and reverse positions for respectively achieving corresponding positions of said third clutch and said reverse clutch; said range shift lever also being swingable to a park position for simultaneously achieving the engaged positions of said first and second clutches; and interlock means including first means responsive to the positioning of said range and speed shift levers for preventing said range shift lever from being shifted to the transport range position when the speed shift lever is in the reverse position and vice versa.

8. The transmission and control therefor defined in claim 7 wherein said interlock means includes second means responsive to the positioning of said range and speed shift levers for preventing said range shift lever from being moved to the park position unless the speed shift lever is in the neutral position.

* * * * *